United States Patent
Xu

(10) Patent No.: US 12,395,238 B2
(45) Date of Patent: Aug. 19, 2025

(54) METHOD AND APPARATUS FOR UE CONTEXT TRANSMISSION AND RECEPTION

(71) Applicant: Lenovo (Beijing) Ltd., Beijing (CN)

(72) Inventor: Min Xu, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 470 days.

(21) Appl. No.: 17/925,792

(22) PCT Filed: Jun. 19, 2020

(86) PCT No.: PCT/CN2020/097208
§ 371 (c)(1),
(2) Date: Nov. 16, 2022

(87) PCT Pub. No.: WO2021/253433
PCT Pub. Date: Dec. 23, 2021

(65) Prior Publication Data
US 2023/0198612 A1    Jun. 22, 2023

(51) Int. Cl.
*H04W 76/20* (2018.01)
*H04B 7/185* (2006.01)
(Continued)

(52) U.S. Cl.
CPC ........ *H04B 7/18558* (2013.01); *H04W 64/00* (2013.01); *H04W 76/20* (2018.02); *H04W 84/06* (2013.01)

(58) Field of Classification Search
CPC ..... H04W 64/00; H04W 76/20; H04W 84/06; H04W 52/0229; H04W 36/0033;
(Continued)

(56) References Cited

U.S. PATENT DOCUMENTS

2019/0327711 A1    10/2019  Zhang
2020/0037285 A1*    1/2020  Sivavakeesar ........ H04W 76/19
(Continued)

FOREIGN PATENT DOCUMENTS

CN    112188568 A    1/2021

OTHER PUBLICATIONS

CATT , "Inactive state and RAN based notification area", 3GPP TSG RAN WG2 Meeting #96, R2-167953, Reno, USA [retrieved Nov. 9, 2022]. Retrieved from the Internet <https://www.3gpp.org/ftp/tsg_ran/WG2_RL2/TSGR2_96/Docs/>., Nov. 2016, 3 Pages.
(Continued)

*Primary Examiner* — Wei Zhao
(74) *Attorney, Agent, or Firm* — FIG.1 Patents

(57) ABSTRACT

The present application relates to a method and an apparatus for UE context transmission and reception. One embodiment of the subject application provides a method performed by a first Base Station (BS), which includes: broadcasting a first RAN-based Notification Area (RNA) covering a RNA location; determining a second BS which is about to cover the RNA location; and transmitting User Equipment (UE) context to the second BS via a direct link between the first BS and the second BS or via a core network before the first BS leaves the RNA location.

20 Claims, 17 Drawing Sheets

(51) Int. Cl.
*H04W 64/00* (2009.01)
*H04W 84/06* (2009.01)

(58) Field of Classification Search
CPC ............ H04W 36/003; H04B 7/18558; H04B 7/1855; H04B 7/185
See application file for complete search history.

(56) References Cited

U.S. PATENT DOCUMENTS

| | | | |
|---|---|---|---|
| 2020/0196379 A1 | 6/2020 | Park | |
| 2020/0351782 A1* | 11/2020 | Kubota | H04W 76/25 |
| 2021/0168779 A1* | 6/2021 | Mondal | H04L 5/0053 |

OTHER PUBLICATIONS

PCT/CN2020/097208, "International Preliminary Report on Patentability", PCT Application No. PCT/CN2020/097208, Dec. 29, 2022, 6 pages.
PCT/CN2020/097208, "International Search Report and Written Opinion", PCT Application No. PCT/CN2020/097208, Mar. 17, 2021, 7 pages.

* cited by examiner

METHOD AND APPARATUS FOR UE CONTEXT TRANSMISSION AND RECEPTION

TECHNICAL FIELD

The subject application relates to wireless communication technology, especially to a method and an apparatus for User Equipment (UE) context transmission and reception.

BACKGROUND OF THE INVENTION

In satellite-based mobile networks, control plane latency might be relatively high when a UE is paged or uplink (UL) transmission occurs in another Base Station (BS) rather than the last serving BS of the UE, due to the unavailability of UE context or the inter-satellite/satellite-to-ground propagation for retrieving the UE context.

Therefore, it is desirable to provide a solution to reduce high control plane latency.

SUMMARY

One embodiment of the subject application provides a method performed by a first Base Station (BS), which includes: broadcasting a first RAN-based Notification Area (RNA) covering an RNA location; determining a second BS which is about to cover the RNA location; and transmitting User Equipment (UE) context to the second BS via a direct link between the first BS and the second BS or via a core network before the first BS leaves the RNA location.

Another embodiment of the subject application provides a method performed by a first Base Station (BS), which includes: determining the first BS is about to cover an RNA location which is covered by a second BS; and receiving User Equipment (UE) context from the second BS via a direct link between the second BS and the first BS or via a core network before the second BS leaves the RNA location.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a first Base Station (BS), which includes: broadcasting a first RAN-based Notification Area (RNA) covering an RNA location; determining a second BS which is about to cover the RNA location; and transmitting User Equipment (UE) context to the second BS via a direct link between the first BS and the second BS or via a core network before the first BS leaves the RNA location.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a first Base Station (BS), which includes: determining the first BS is about to cover an RNA location which is covered by a second BS; and receiving User Equipment (UE) context from the second BS via a direct link between the second BS and the first BS or via a core network before the second BS leaves the RNA location.

DETAILED DESCRIPTION

Figure 1A:
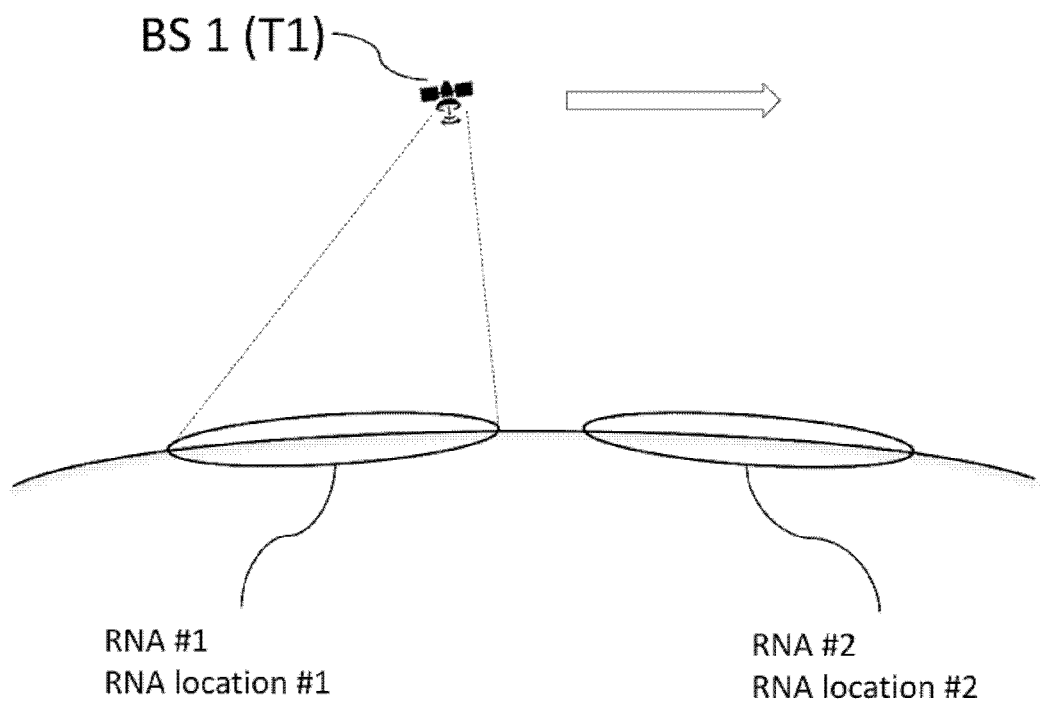
FIGS. 1(a)-1(c) illustrate a scenario that a broadcasted RNA is changed as Non-terrestrial Networks (NTN) Low Earth Orbit (LEO) satellites move.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

In New Radio (NR), in order to further reduce control plane latency, especially for the control plane latency of the transition from the RRC_IDLE state to the RRC_CONNECTED state, the RRC_INACTIVE state was introduced in which a UE remains in the CM-CONNECTED state and can move within an area configured by a Next-Generation Radio Access Network (NG-RAN) without notifying the NG-RAN. The area is the RAN-based Notification Area (RNA). The RNA may cover a single cell or multiple cells and shall be contained within the Core Network (CN) registration area. When the UE initiates a cell reselection procedure to select a cell that does not belong to the configured RNA, the UE sends a RAN-based notification area update (RNAU).

For the RRC_INACTIVE state, the last serving Base Station (BS) keeps the UE context, for example, the UE Access Stratum (AS) context, and the UE-associated NG connection with the serving Access and Mobility Management Function (AMF) and User Plane Functions (UPF), and a quick Radio Resource Control (RRC) connection resume can be made when returning to the RRC_CONNECTED state.

In certain embodiments, the BS may be referred to as an access point, an access terminal, a base, a macro cell, a Node-B, an enhanced Node B (eNB), a gNB, a Home Node-B, a relay node, or any device described using other terminology used in the art. The BS is generally part of a radio access network that may include one or more controllers communicably coupled to one or more corresponding BSs. The BS may also be a satellite in Low Earth Orbit (LEO).

In satellite-based mobile networks with LEO satellites orbiting around the Earth, it is found that if the Tracking Area (TA) moves with the cell or the satellite, the static or moving UEs will have to return to RRC_CONNECTED and perform a TA update every few minutes as the LEO satellite passes by, which causes unacceptable signalling overhead and power consumption. Therefore, an Earth-fixed TA is assumed for the work item phase of 3GPP NR Non-terrestrial Networks (NTN).

The UE in the RRC_INACTIVE state will have to face the similar situation, that is, the UE will frequently send an RNAU due to the satellite movement. Therefore, Earth-fixed RNA shall be assumed as well. For a NTN LEO, this implies that the broadcasted RNA is changed when the NTN LEO satellite/cell arrives to the area of next Earth-fixed RNA location.

Figure 1B:
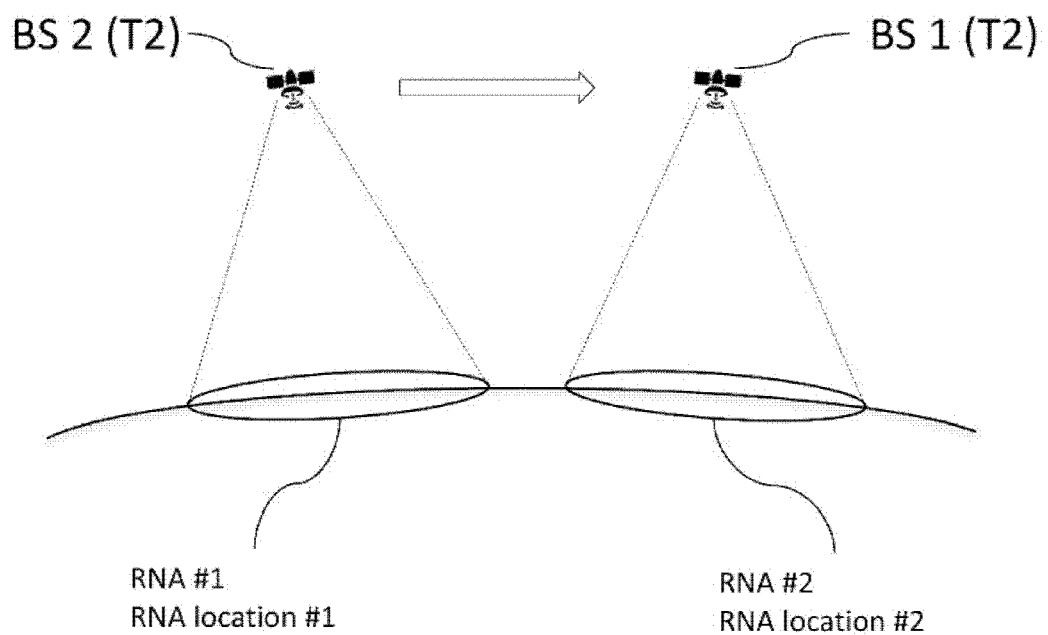
Figure 1C:
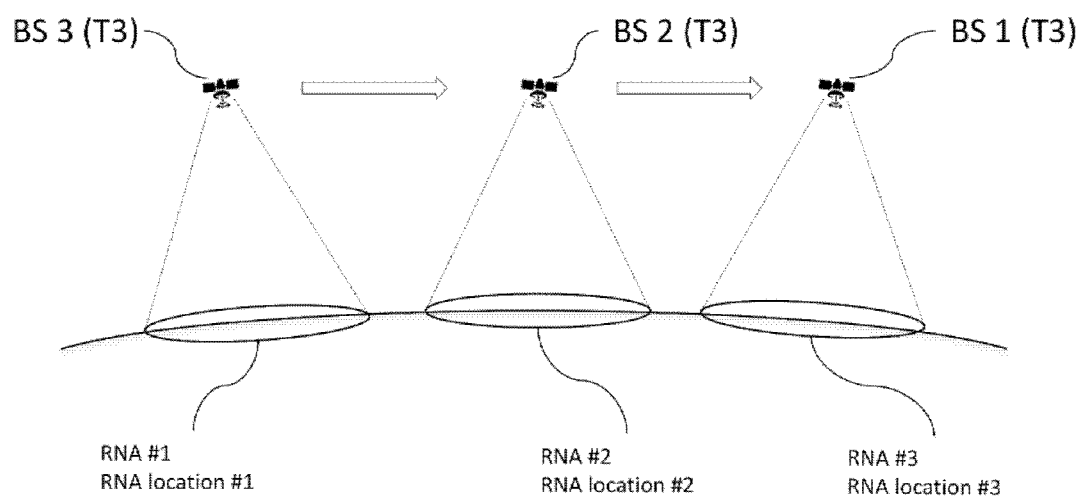

FIGS. 1(a), 1(b), and 1(c) illustrate a scenario that the broadcasted RNA is changed as the NTN LEO satellites move. In FIG. 1(a), the first satellite, BS 1 is covering RNA location #1 at time T1, and is broadcasting RNA #1. BS 1 is about to move to RNA location #2. In FIG. 1(b), at time T2, BS 1 has moved to RNA location #2, and the second satellite, BS 2 has moved to RNA location #1. Therefore, at time T2, BS 1 stops broadcasting RNA #1, and broadcasts RNA #2 instead. BS 2, which takes the place of BS 1, broadcasts RNA #1 at the time T2. In FIG. 1(c), at time T3, BS 1 has moved to RNA location #3, BS 2 has moved to RNA location #2, and BS 3 has moved to RNA location #1. Thus, at time T3, BS1 broadcasts RNA #3, BS 2 broadcasts RNA #2, and BS 3 broadcasts RNA #1.

According to 3GPP documents, if the last serving BS receives downlink (DL) data from the UPF or DL UE-associated signalling from the AMF, except the UE Context Release Command message, while the UE is in RRC_INACTIVE, it pages in the cells corresponding to the RNA. If the UE accesses a BS, e.g. UL transmission triggering or being paged, other than the last serving BS, the receiving BS triggers the XnAP Retrieve UE Context procedure to get the UE context from the last serving BS. The UE context may be UE AS context, which is different from the UE NAS context stored in the core network. Despite of the fact that the Earth-fixed RNA can greatly reduce an RNAU, this fixed design combined with the moving BS, e.g. moving satellite, also brings in new issues related to the UE AS context.

For example, in FIG. 1(a), at time T1, a UE in RNA location #1 is served by BS 1, which broadcasts RNA #1, and the UE enters into the RRC_INACTIVE state. At time T2, the UE will not update the RNA, that is to say, the UE will not trigger RNAU, because BS 2 continues to broadcast RNA #1.

In FIG. 1(b), regarding DL transmission, at time T2, if there are DL data from the UPF or DL UE-associated signalling from the AMF for this UE, two events might happen:
i) BS 1, which is the last serving BS and bears the UE AS context, will try to page the UE, but will get a certain failure because the UE is out of coverage of BS 1; or
ii) BS 2, which is the BS currently broadcasting RNA #1, will try to retrieve the UE AS context from BS 1.

Regarding UL transmission, at time T2, if the UE transmits UL data or UL signalling, it will trigger the RRC connection to resume to BS 2 but there is no UE AS context. So BS 2 tries to retrieve the UE AS context from BS 1.

However, for both DL and UL transmissions, the UE AS context in BS 1 may be unavailable. For example, the UE context might be deleted by BS 1 at time T2, or there is no connection, for example, the Xn interface, between the BS 1 and BS 2, therefore, connection re-establishment is needed. In addition, the latency of retrieving the UE AS context can be relatively high due to inter-satellite propagation or satellite-to-ground propagation. As a result, total control plane latency can be comparable to or even larger than the latency of the transition from the RRC_IDLE state to the RRC_CONNECTED state, which renders the RRC_INACTIVE state meaningless and the user's experience is adversely affected as well.

In conclusion, if an Earth-fixed RNA is assumed for the UEs in an RRC_INACTIVE state served by a NTN LEO, the control plane latency can be relatively large when the UE is paged or the UL transmission occurs in another BS rather than the last serving BS, due to the unavailability of the UE AS context or the inter-satellite/satellite-to-ground propagation for retrieving the UE context. It should be noticed that this issue does not only happen to one specific UE, but to all UEs that enter into the RRC_INACTIVE state within the coverage of BS 1. These UEs need to return to RRC_CONNECTED within the coverage of another satellite rather than BS 1.

Figure 2A:
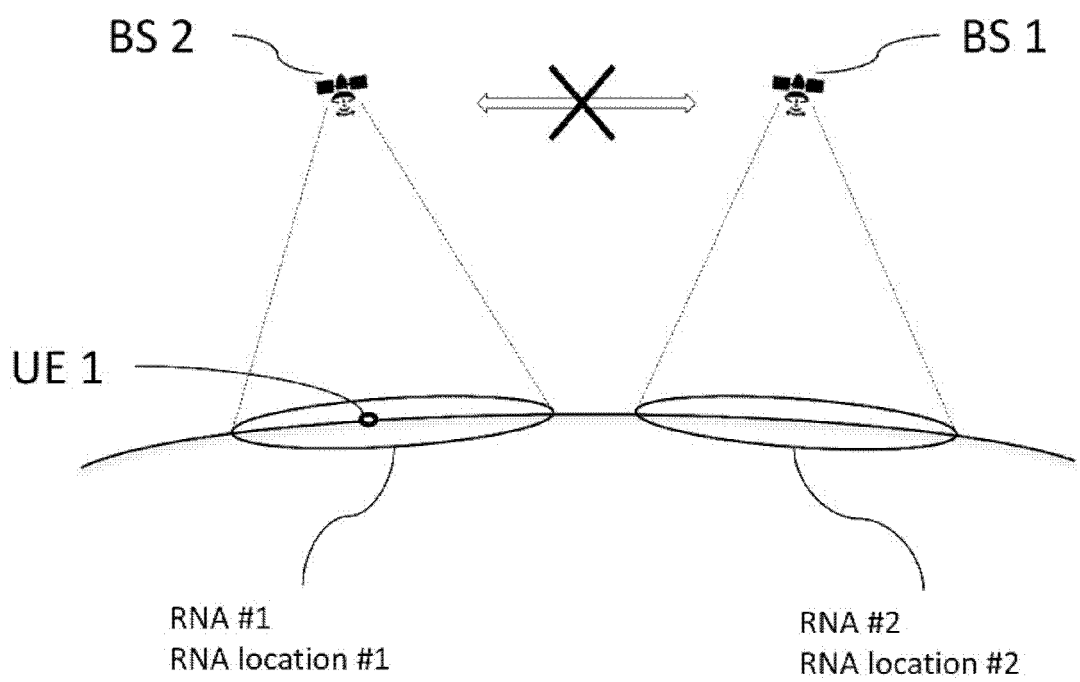
FIGS. 2(a)-2(c) illustrate solutions for obtaining the UE context.
Figure 2B:
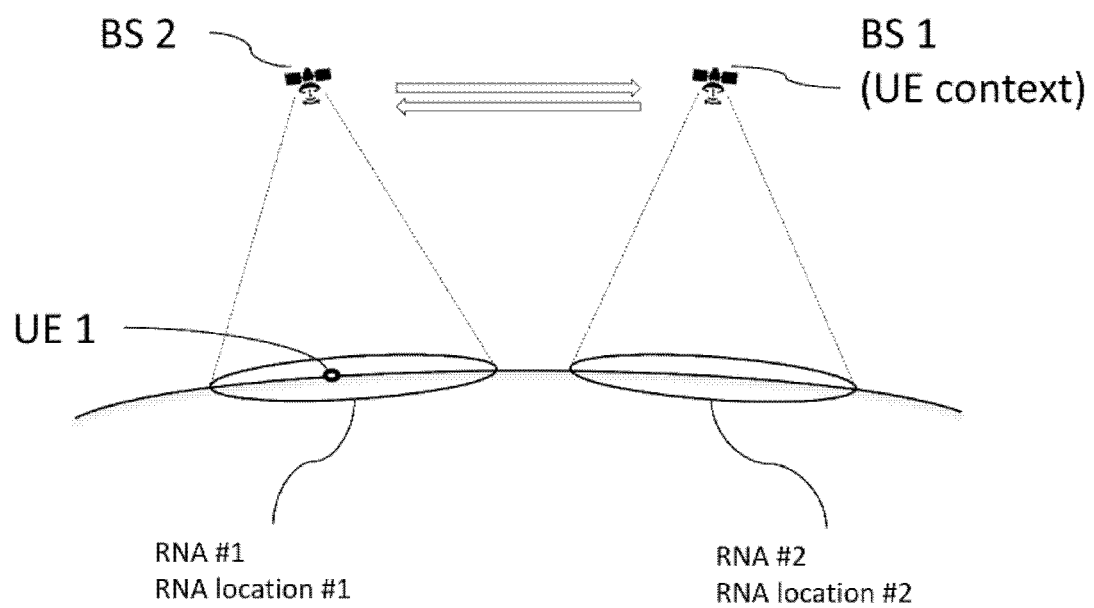
Figure 2C:
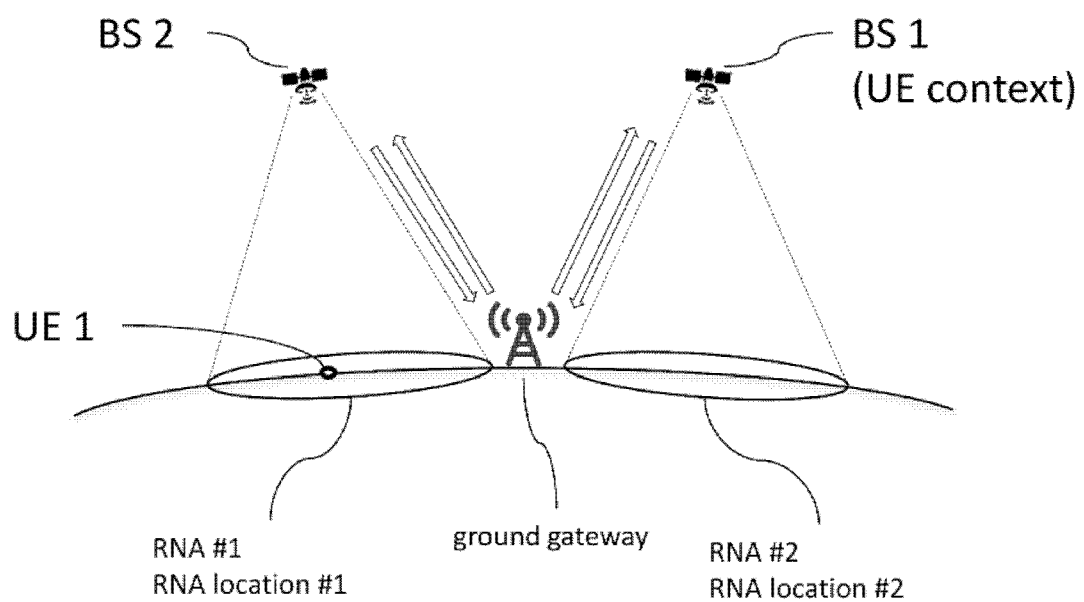

According to the disclosed information including 3GPP documents, several solutions are provided. FIGS. 2(a), 2(b), and 2(c) illustrate solutions for obtaining the UE context.

FIG. 2(a) depicts two BSs, BS 1 and BS 2. BS 1 used to cover RNA location #1, moved to RNA location #2, and is covering RNA location #2 at present. UE 1 is a UE located in RNA location #1, and entered into an RRC_INACTIVE state before BS 1 moved to RNA location #2. BS 1 might delete the UE context of UE 1 because: i) BS 1 no longer covers RNA location #1; ii) no periodic RNAU received from the UE 1; or iii) a paging failure to UE 1 occurred. Since there is no UE context in BS 1, therefore, BS 1 cannot transmit the UE context to BS 2. In another case, there is no connection, e.g. an Xn interface or other inter-satellite connection, between BS 1 and BS 2, thus the UE context cannot be transmitted. The current accessing BS, BS 2, then skips retrieving UE context from the last serving BS, BS 1, and initiates an RRC connection and UE-associated NG connection re-establishment.

FIG. 2(b) depicts another method for obtaining the UE context. In FIG. 2(b), BS 1 did not delete the UE context, and BS 1 and BS 2 are connected via an Xn interface or a satellite system interface based on an Inter-satellite Link (ISL). In this solution, BS 2 retrieves the UE context from BS 1.

FIG. 2(c) depicts yet another method for obtaining the UE context. In FIG. 2(b), BS 1 did not delete the UE context, and BS 1 and BS 2 are NOT directly connected. For example, there is no Xn interface or satellite system interface based on an Inter-satellite Link (ISL) between BS 1 and BS 2. In this solution, BS 2 retrieves the UE context from BS 1 via the ground gateway.

In FIG. 2(*a*), BS 2 can save time retrieving the UE context from BS 1, because no matter whether UE context in BS 1 is available or not, BS 2 skips obtaining it. However, without the UE context, two procedures, i.e. the RRC connection re-establishment and a UE-associated NG connection re-establishment are needed, therefore, the control plane latency is similar to the latency of the transition from the RRC_IDLE state to the RRC_CONNECTED state.

In FIG. 2(*b*), the control plane latency only includes the roundtrip propagation on an ISL between BS 1 and BS 2, which has the lowest latency among the three solutions. Nevertheless, this solution is feasible only when: i) BS 1 still keeps the UE context; and ii) there is an ISL, an Xn interface, or a satellite system interface between BS 1 and BS 2 is established.

In the solution in FIG. 2(*c*), in which the UE context is retrieved from BS 1 via the ground gateway, this solution also requires that BS still keeps the UE context. Control plane latency includes roundtrip propagation of 4 satellite-to-ground links, and could be relatively high.

Based on the analysis for the above-mentioned solutions, control plane latency could either be unacceptable for the UEs with the RRC_INACTIVE state, or tolerable under strict conditions.

The main reason is that the UE AS context is stored in the last serving BS until a retrieve request is received, and the retrieve request is triggered by incoming DL paging or UL transmission. This design is reasonable for the terrestrial network or the BS with a fixed location where the RNA is determined and rarely changes. However, when the BS is mobile and its corresponding RNA changes accordingly, e.g. a NTN LEO scenario, the above issue occurs. The solutions in FIGS. 2(*a*)-2(*c*) try to remedy the control plane latency after the occurrence of DL paging or UL transmission, and the effect is not ideal.

One of the embodiments of the subject disclosure proposes to pre-transfer the UE context. In other words, BS 1 may transfer the UE context before BS 1 leaves the current RNA location to BS 2 which is going to cover the same area covered by BS 1.

Typically in satellite-based mobile networks, the trajectories and positions of satellites are known to each other or to the core network, and thus the current and the next satellites covering an Earth-fixed RNA can be determined. Therefore, pre-transferring of the UE AS context takes the advantages of this characteristic, and can reduce the latency of retrieval and avoid possible deletion with affordable network overhead.

Figure 3A:
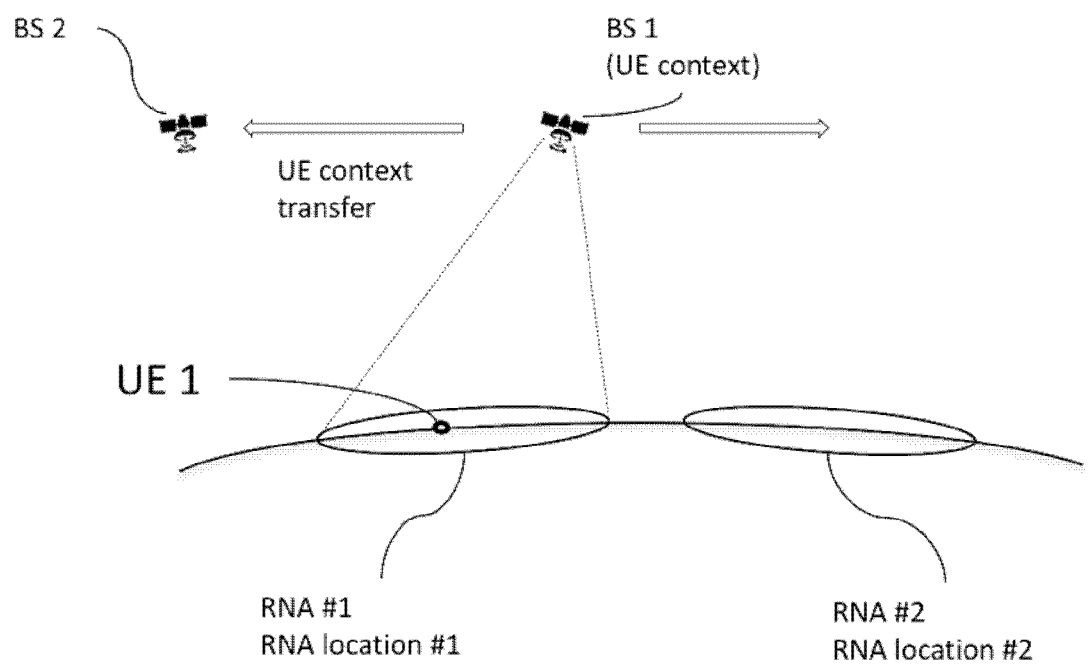
FIGS. 3(a) and 3(b) illustrate a method for transferring the UE context before a BS leaves the current RNA location according to some embodiments of the subject application.
Figure 3B:
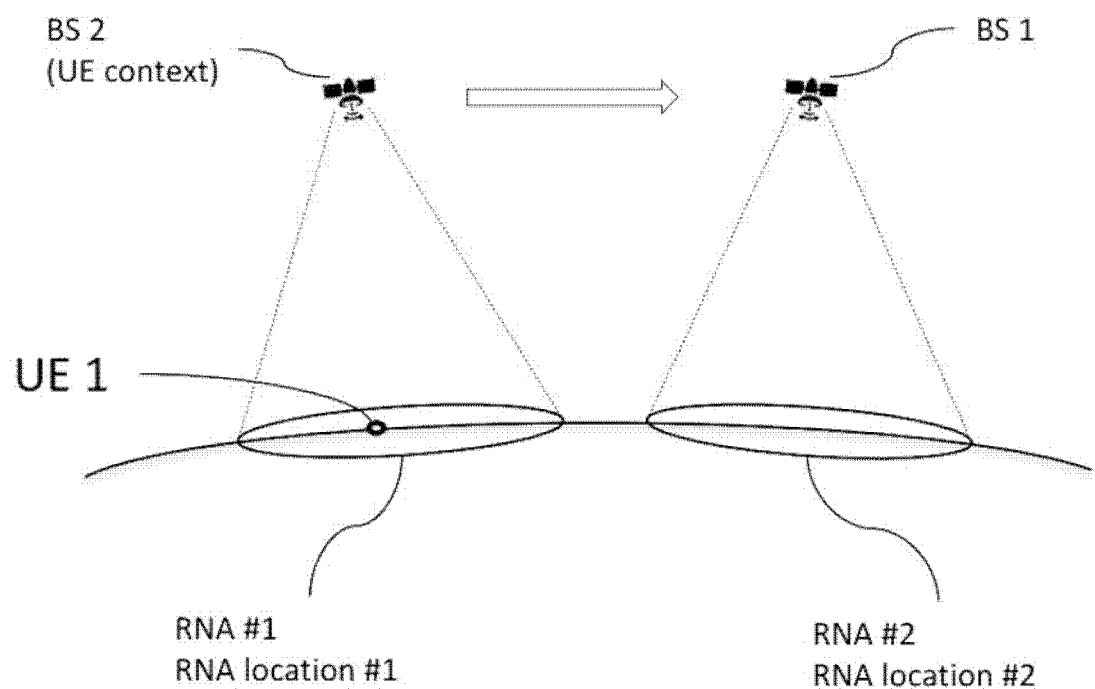

FIGS. 3(*a*) and 3(*b*) illustrate a method for transferring the UE context before a BS leaves the current RNA location according to some embodiments of the subject application.

In FIG. 3(*a*), BS 1 may refer to a BS that is about to leave its current RNA location (e.g. RNA location #1) within a period of time, and BS 2 may refer to a BS that will arrive the RNA location (e.g. RNA location #1) which is currently covered by BS 1. At time T1, BS 1 is about to leave RNA location #1, BS 1 determines that BS 2 will take BS 1's place (e.g., may cover the same RNA location), and transmits the UE context to BS 2 before BS 1 leaves RNA location #1.

In FIG. 3(*b*), at time T2, BS 1 has transmitted the UE context to BS 2, and is covering RNA location #2.

Figure 4A:
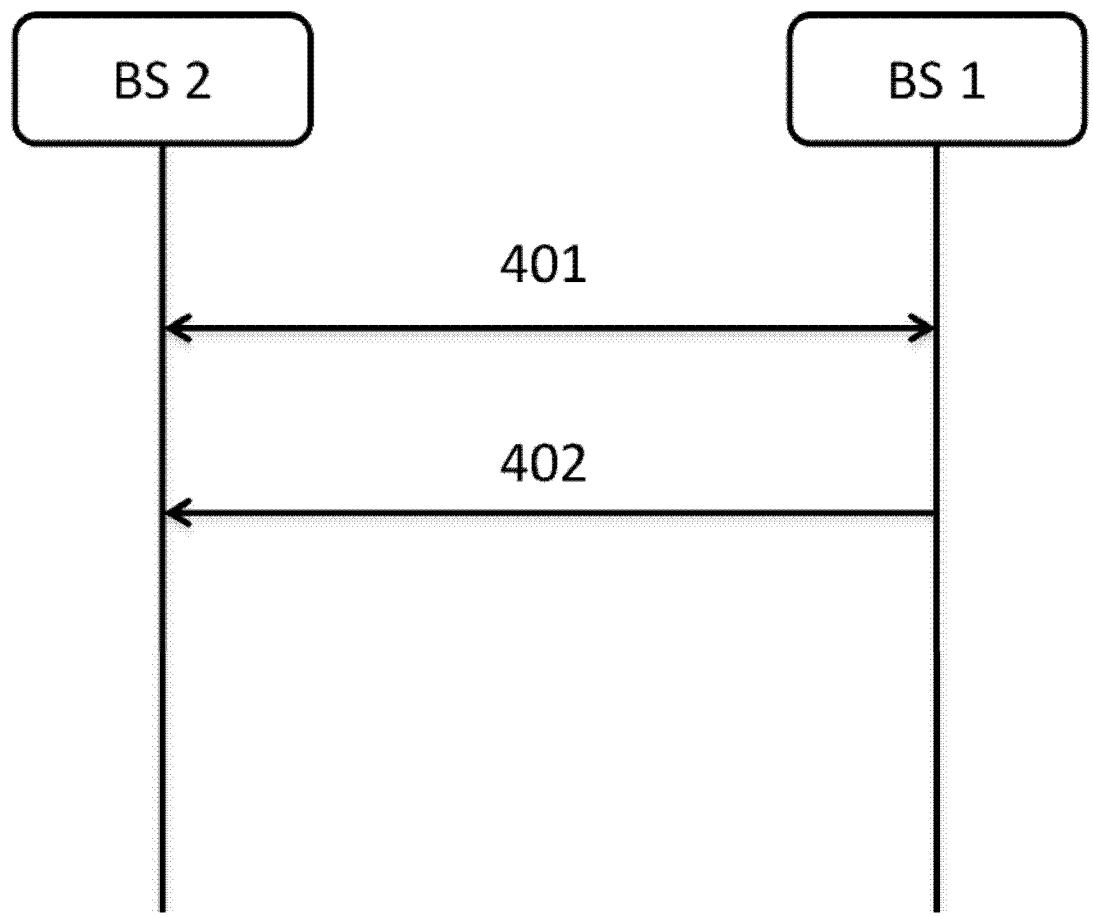
FIGS. 4(a)-4(c) illustrate flowcharts for transferring the UE context before a BS leaves the current RNA location according to some embodiments of the subject application.
Figure 4B:
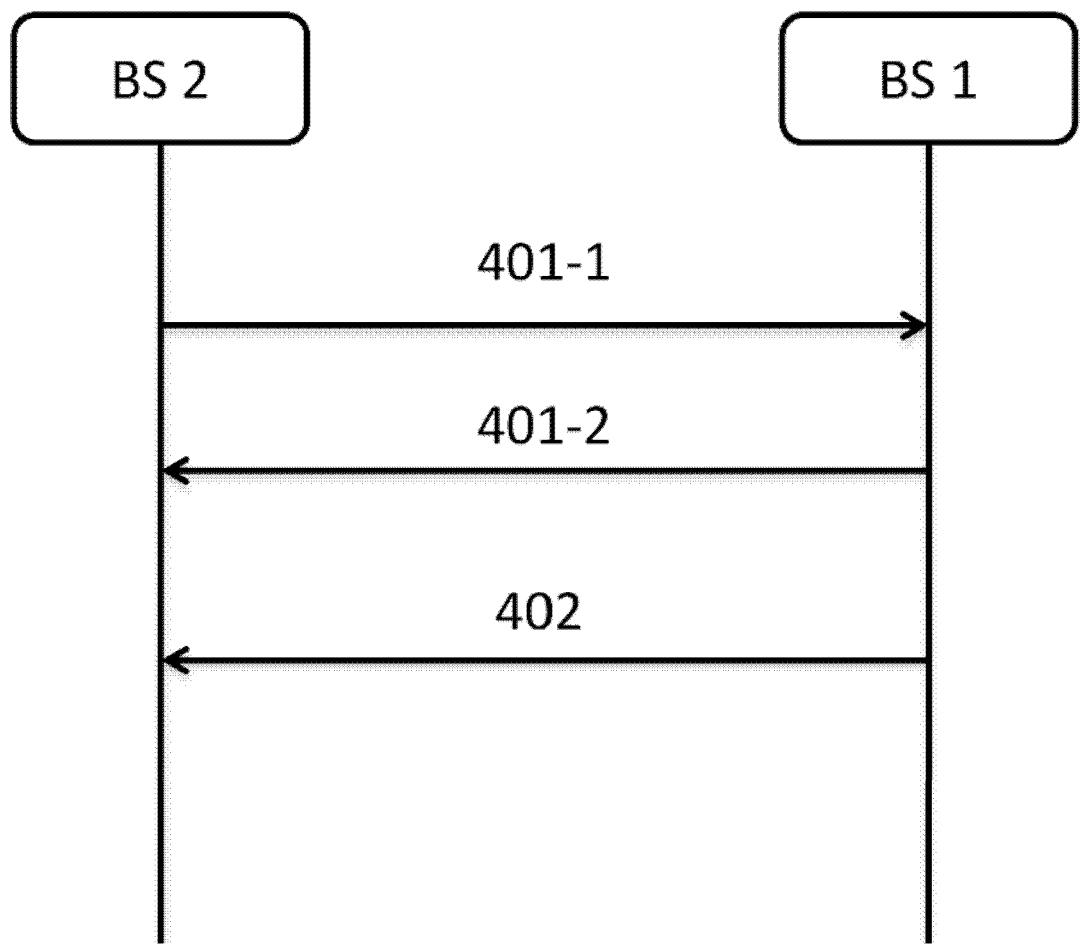
Figure 4C:
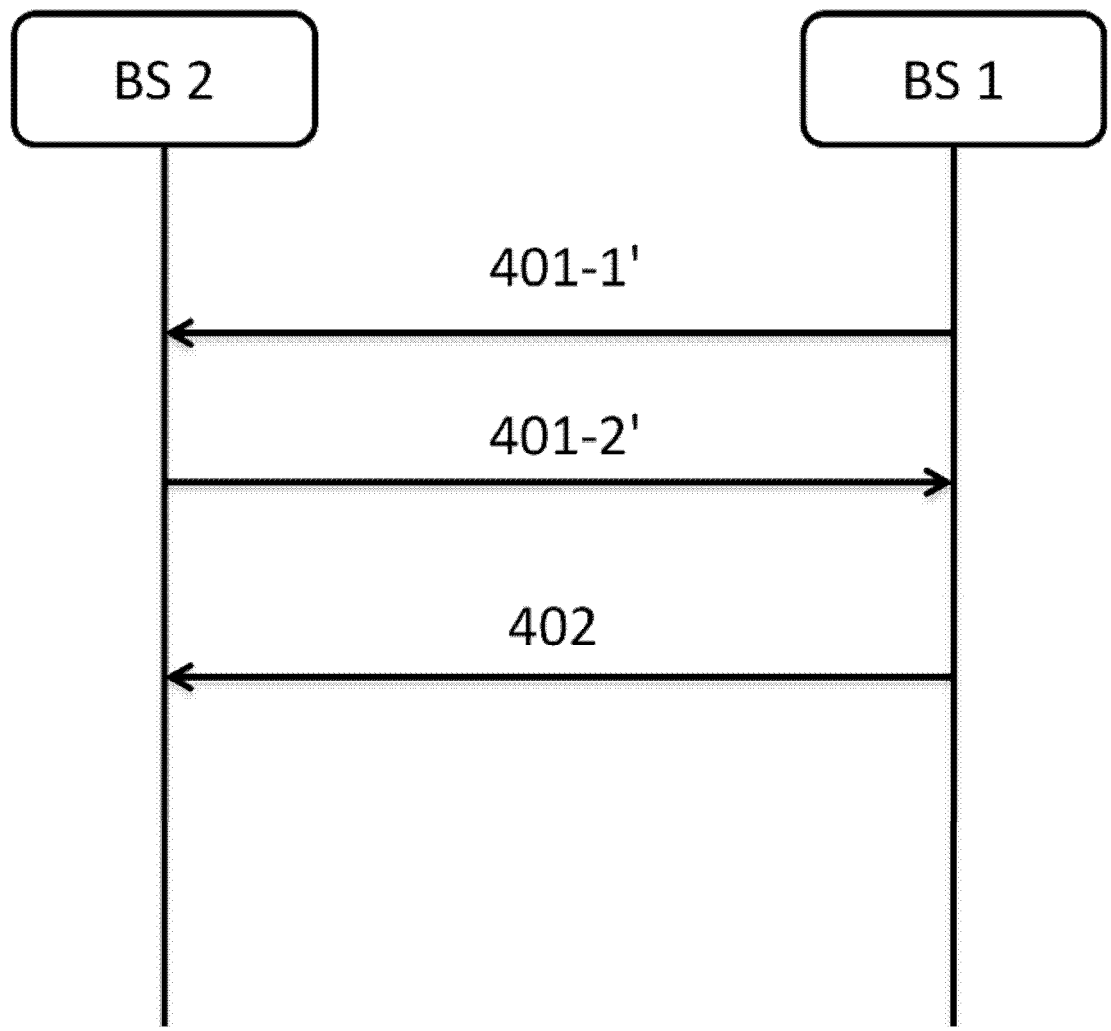

FIG. 4(*a*) illustrates a flowchart of one embodiment for transferring the UE context before a BS (e.g., BS 1) leaves the current RNA location according to some embodiments of the subject application.

In FIG. 4(*a*), BS 1 and BS 2 are connected via an Xn interface or Inter-satellite Link (ISL). In step 401, BS 1 determines that BS 2 is the BS that is about to cover the RAN location where BS 1 is now covering. In step 402, BS 1 transmits the UE context to BS 2 before BS 1 leaves the RNA location.

FIG. 4(*b*) illustrates detailed operations of the flowchart in FIG. 4(*a*) according to some embodiments of the subject application. For example, the step 401 as shown in FIG. 4(*a*) may further include step 401-1 and step 401-2. Based on the trajectory and/or position information, that is, ephemeris data, which may be provided by BS 1, by the core network, or by the UE, BS 2 is aware of BS 1. In step 401-1, BS 2 transmits a request message to BS 1, requesting the UE context before BS 2 enters RNA location #1.

The request message may be triggered by at least one of the following parameters:
  i. A time or a timer; that is, when BS 2 is entering/to enter the next RNA location, RNA location #1. For example, BS 2 will enter RNA location #1 at 8:00 a.m., and the time is set as 7:50 a.m., then at 7:50 a.m., the request message is triggered and is transmitted to BS 1.
  ii. An event; for instance, an event that BS 2 is entering/to enter the next RNA location, RNA location #1.
  iii. A location; for example, a location that is pre-set as an entering point for RNA location #1. When BS 2 arrives at the pre-set location, the request message is triggered and is transmitted to BS 1.

The request message may include at least one of the following parameters:
  i. An identity of the next RNA of BS 2;
  ii. A storage capability of BS 2;
  iii. A total number of UEs for which BS 2 can reserve radio resources; and
  iv. A time when BS 2 leaves the RNA location, RNA location #1.

In step 401-2, BS 1 transmits a response message to BS 2. The response message may be acceptance, that is, an acknowledgement (ACK), or rejection, e.g. a non-acknowledgement (NACK). The response message is determined based on the parameters included in the request message and/or the parameters of BS 1. Specifically, regarding the above parameters included in the request message, BS 1 determines the response message based on at least one of the following conditions:
  condition i. whether the identity of the RNA that BS 1 covers at present is the same as the identity of the next RNA of BS 2, in other words, whether BS 2 is the BS that is about to cover RNA location #1, which is covered by BS 1 at present. If BS 2 is about to cover another location, for example, RNA location #7, rather than RNA location #1, BS 1 shall transmit a NACK to BS 2. If BS 2 is going to cover RNA location #1, then condition i) is satisfied.
  condition ii. whether the data size to be transferred is not larger than the storage capability of BS 2, to put it simply, whether the storage capability of BS 2 is sufficient to store the data to be transmitted by BS 1. If the storage capability of BS 2 is sufficient, then condition ii) is satisfied, otherwise, further operations might be required.
  condition iii. whether the number of UEs whose UE context is to be transferred is not more than the number of UEs for which BS 2 can reserve radio resources, basically, it means whether BS 2 can provide the service to all the UEs. If BS 2 is capable of providing service for all the UEs, then condition iii) is satisfied, if not, further operations might be required.

condition iv. whether the time to start a UE context transmission is not later than the time when BS 2 leaves the RNA location. If BS 1 is about to transmit the UE context at 8:00 a.m., but BS 2 leaves the RNA location at 7:50 a.m., then it is meaningless to perform the transmission; if BS 2 leaves the RNA location later than 8:00 a.m., such as 8:30 a.m., then condition iv) is met.

After performing the above determinations, BS 1 determines the response message. If the response is NACK, BS 1 may also include the reason why BS 1 refuses the UE context transmission in the response.

If the response is ACK, then in step 402, BS 1 transmits the UE context to BS 2 via an available interface between BS 1 and BS 2. The UE context includes the UE context of one or more UEs which enter into the RRC_INACTIVE state when accessing BS 1. The UE context may also include the UE context previously transferred from another BS to BS 1, for example, BS 3.

FIG. 4(*c*) illustrates detailed operations of the flow chart in FIG. 4(*a*) according to other embodiments of the present disclosure. For example, the step 401 as shown in FIG. 4(*a*) may further include step 401-1' and step 401-2'. Based on the trajectory and/or position information, that is, ephemeris data, which may be provided by BS 2, by the core network, or by the UE, BS 1 is aware of BS 2. In step 401-1', BS 1 transmits a request message to BS 2, requesting the permission to transmit the UE context to BS 2 before BS 1 leaves RNA location #1.

The request message may be triggered by at least one of the following parameters:

i. A time or a timer, that is, when BS 1 is leaving/to leave its current RNA location. For example, BS 1 will leave RNA location #1 at 8:00 a.m., and the time is set as 7:50 a.m., then at 7:50 a.m., the request message is triggered and is transmitted to BS 2.

ii. An event, for instance, BS 1 is leaving/to leave its current RNA location, RNA location #1.

iii. A location; for example, a location that is pre-set as a leaving point for the current RNA location, RNA location #1. When BS 1 arrives at the pre-set location, the request message is triggered and is transmitted to BS 2.

The request message includes at least one of the following parameters:

i. An identity of the RNA that currently corresponds to BS 1;

ii. A data size of the UE context to be transferred;

iii. A total number of UEs whose UE context is to be transferred; and iv. A time to start UE context transfer if accepted.

In step 401-2', BS 2 transmits a response message to BS 1. The response message may be acceptance, that is, an acknowledgement (ACK), or rejection, e.g. a non-acknowledgement (NACK). The response message is determined based on the parameters included in the request message and/or the parameters of BS 2. Specifically, regarding the above parameters included in the request message, BS 2 determines the response message based on at least one of the following conditions:

condition i. whether the identity of RNA that BS 1 covers is the same as the identity of the next RNA of BS 2, in other words, whether BS 2 is the BS that is about to cover RNA location #1, which is covered by BS 1 at present. If BS 2 is about to cover another location, for example, RNA location #7, rather than RNA location #1, BS 2 shall transmit a NACK to BS 1. If BS 2 is going to cover RNA location #1, then this condition is satisfied.

condition ii. whether the data size to be transferred is not larger than the storage capability of BS 2, to put it simply, whether BS 2 has sufficient storage to store the data to be transmitted by BS 1. If the storage capability of BS 2 is sufficient, then condition 2) is satisfied, if not, further operations might be required.

condition iii. whether the number of UEs whose UE context is to be transferred is not more than the number of UEs for which BS 2 can reserve radio resources, basically, it means whether BS 2 can provide the service to the UE. If BS 2 is capable of providing service for all the UEs, then condition iii) is satisfied, if not, further operations might be required.

condition iv. whether the time to start a UE context transmission is not later than the time when BS 2 leaves the RNA location. If BS 1 is about to transmit the UE context at 8:00 a.m., but BS 2 leaves the RNA location at 7:50 a.m., then it is meaningless to perform the transmission; if BS 2 leaves the RNA location later than 8:00 a.m., such as 8:30 a.m., then condition iv) is met.

After performing the above determinations, BS 2 determines the response message. If the response is NACK, BS 2 could also include the reason why BS 2 refuses the UE context transmission in the response.

If the response is ACK, then in step 402, BS 1 transmits the UE context to BS 2 via an available interface between BS 1 and BS 2. The UE context includes the UE context of one or more UEs which enter into the RRC_INACTIVE state when accessing BS 1. The UE context may also include the UE context previously transferred from another BS to BS 1, for example, BS 3.

Figure 5A:
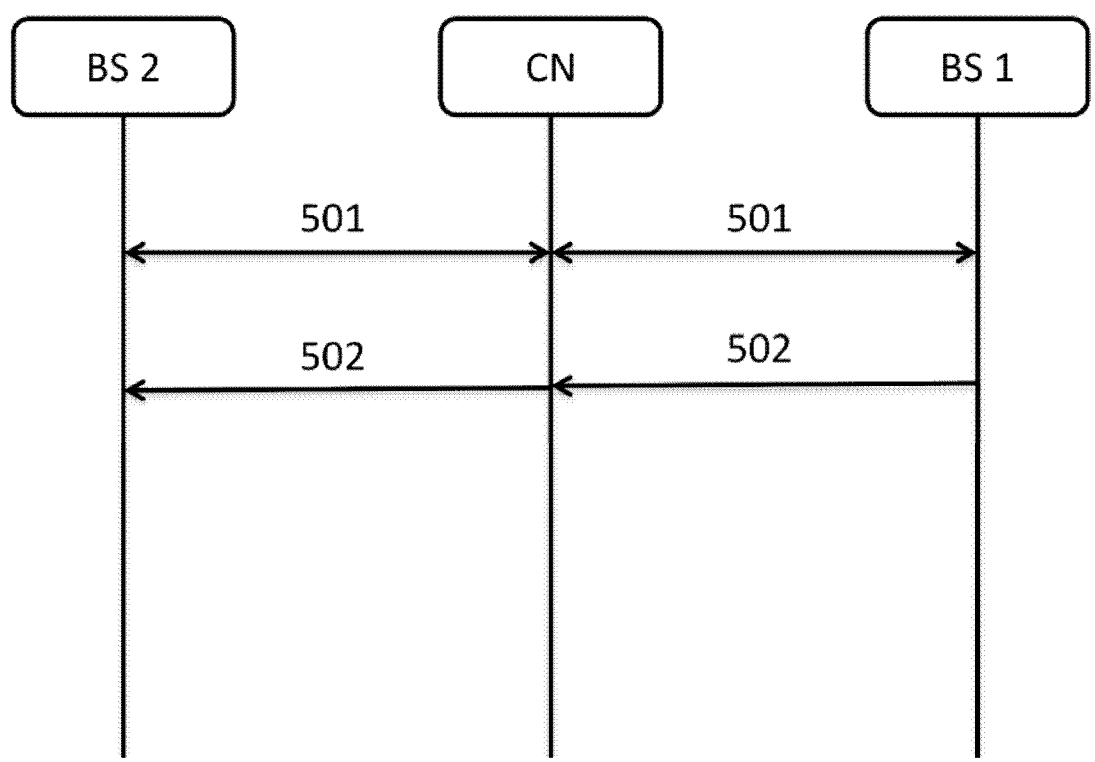
FIGS. 5(a)-5(c) illustrate flowcharts for transferring the UE context before a BS leaves the current RNA location according to some embodiments of the subject application.
Figure 5B:
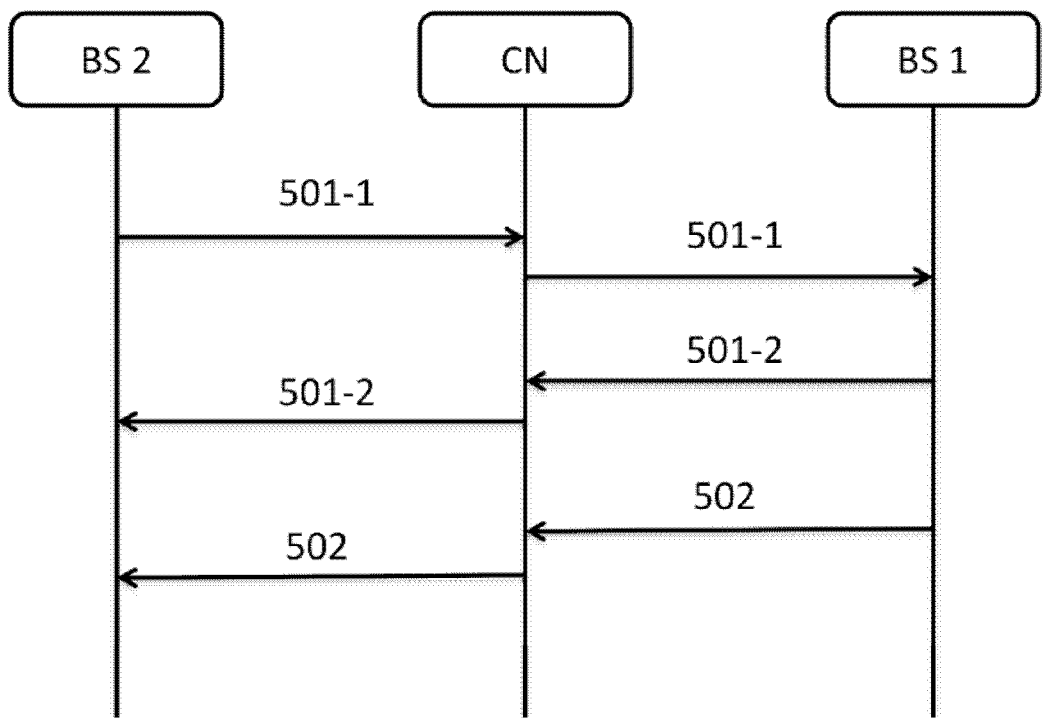

FIG. 5(*a*) illustrates a flowchart for transferring the UE context before a BS leaves the current RNA location according to some embodiments of the subject application.

In FIG. 5(*a*), there is no direct connection between BS 1 and BS 2, or BS 1 is unaware that BS 2 will cover RNA location #1 which is covered by BS 1 at present, or BS 2 is unaware that which BS is covering the next RNA location of BS 2, the communication between BS 1 and BS 2 is completed via the core network (CN). More specifically, the communication between BS 1 and BS 2 is completed via an available interface between BS 1 and the core network and an available interface between the core network and BS 2.

In step 501, BS 1 determines that BS 2 is the BS that is about to cover via the core network, e.g. the available interface between BS 1 and the core network and the available interface between the core network and BS 2. In step 502, BS 1 transmits the UE context to BS 2 before BS 1 leaves the RNA location via the core network.

FIG. 5(*b*) illustrates detailed operations of the flowchart in FIG. 5(*a*) according to some embodiments of the subject application. For example, the step 501 as shown in FIG. 5(*a*) may further include step 501-1 and step 501-2. In step 501-1, BS 2 transmits a request message to the core network, and the core network forwards the request to BS 1, requesting the UE context before BS 2 enters RNA location #1. In step 501-2, BS 1 transmits a response message to the core network, then the core network forwards the response to BS 2. The request message and the response message are similar to those messages in the flowchart in FIG. 4(*b*), and the details are omitted here.

If the response is ACK, then in step 502, BS 1 transmits the UE context to BS 2 via the core network.

Figure 5C:
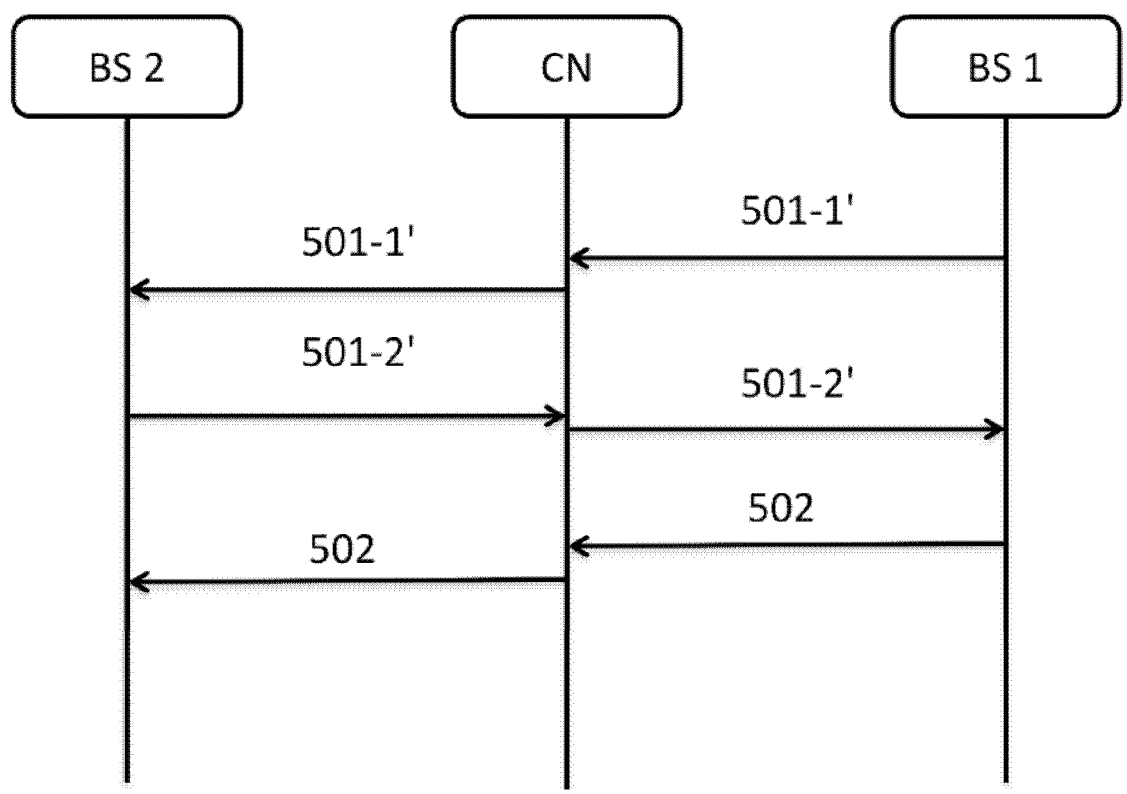

FIG. 5(c) illustrates detailed operations of the flowchart in FIG. 5(a) according to some embodiments of the subject application. For example, the step 501 as shown in FIG. 5(a) may further include step 501-1' and step 501-2'.

In step 501-1', BS 1 transmits a request message to the core network, and the core network forwards the request to BS 2, requesting the UE context before BS 1 leaves RNA location #1. In step 501-2', BS 2 transmits a response message to the core network, then the core network forwards the response to BS 1. The request message and the response message are similar to those messages in the flowchart in FIG. 4(b), and the details are omitted here.

If the response is ACK, then in step 502, BS 1 transmits the UE context to BS 2 via the core network.

After any one of the solutions in FIGS. 4(a)-5(c) is completed, BS 2 can resume RRC connection using to the UE context pre-transferred from BS 1 if the UE is paged or initiates UL transmission.

In any one of the solutions in FIG. 4(a)-5(c), when the UE context transfer is completed, BS 1 may send an end marker to BS 2. BS 1 may send a notification message to the core network indicating that the UE context has been transmitted to BS 2. The notification message may include a list of UE whose UE context has been transmitted to BS 2.

Similarly, when the UE context is successfully received, BS 2 may send an ACK to BS 1. BS 2 may send a notification message to the core network indicating that the UE context has been transmitted from BS 1. The notification message may also include a list of UE whose UE context has been transmitted to BS 2. When BS 2 is leaving RN location #1, BS 2 could also perform the method implemented by BS 1 as explained above, to transfer the UE context to the next BS.

When the core network receives the notification message from BS 1, or the notification message from BS 2, the core network will consider BS 2 as the last serving BS for these UEs, forward paging messages for these UEs to BS 2, and switch UE-associated NG connections of these UEs to BS 2.

Figure 6:
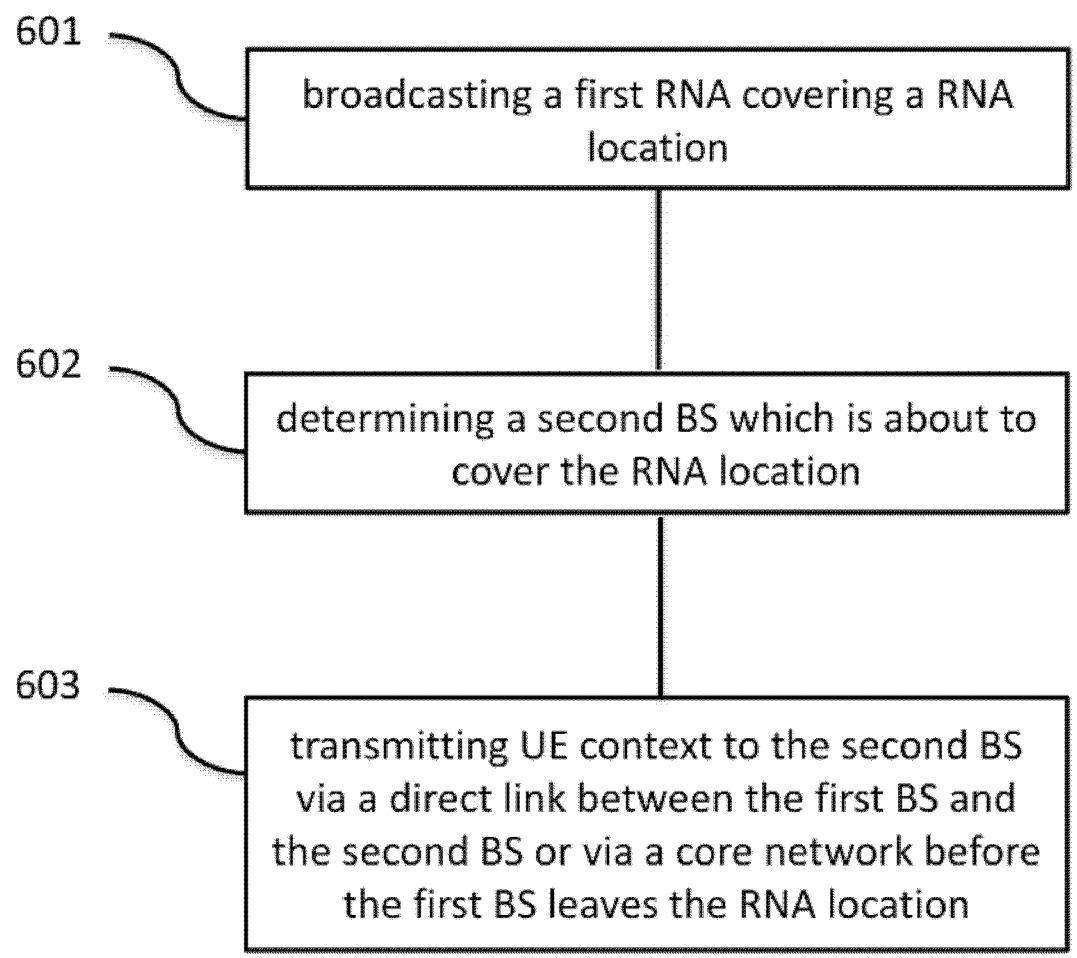
FIG. 6 illustrates a method performed by a BS for wireless communication according to some embodiments of the subject disclosure.

To further compare the advantages of the proposed solutions with the prior art, a comparison table is presented as follows:

FIG. 6 illustrates a method performed by a BS for wireless communication according to some embodiments of the subject disclosure. In particular, FIG. 6 depicts the method performed by BS 1. In step 601, the first BS broadcasts a first RNA covering an RNA location, that is, BS 1 broadcast RNA #1 covering RNA location #1. In step 602, the first BS determines that a second BS is about to cover the RNA location, and in step 603, the first BS transmits UE context to the second BS via a direct link between the first BS and the second BS or via a core network before the first BS leaves the RNA location. In other words, BS 1 determines that BS 2 is about to arrive at the RNA location, and transmits the UE context to BS 2 directly or indirectly before BS 1 leaves the RNA location.

The UE context may include the UE context of one or more UEs which enter into an inactive state when accessing the first BS, that is, the UE context of the UEs entering into the RRC_INACTIVE state when accessing BS 1. The UE context may include the UE context previously transmitted from a third BS.

When the UE context transmission completed, BS 1 may transmit an indicator indicating an end of the UE context transmission to BS 2. Then BS 1 may receive an ACK or NACK from BS 2 for the UE context transmission. BS 1 may transmit a message to the core network indicating that the UE context has been transmitted to BS 2.

BS 1 may determine BS 2 based on the ephemeris data from BS 2, from the core network, or from a UE.

BS 1 transmitting the UE context to BS 2 is triggered if at least one of the following conditions is met: i) a timer of BS 1 expires; ii) BS 1 is about to leave RNA location #1; and iii) BS 1 is at a leaving point of RNA location #1. Then BS 1 transmits a request to BS 2, for permission to transmit the UE context stored in BS 1, for example, the method step 401-1' in FIG. 4(c). In one embodiment, the request may include: i) an identity of the RNA of BS 1, which is: RNA #1; ii) a data size of the UE context to be transmitted; iii) a total number of UEs whose UE context is to be transmitted; and/or iv) a time for transmitting the UE context.

BS 1 then receives a response from BS 2, and BS 2 made the response at least based on one of the following conditions:

TABLE 1

A comparison of solutions in control plane latency

| Solutions | Descriptions | Control Plane latency | Preconditions |
|---|---|---|---|
| Standard | Try to retrieve with a possible failure and then re-establishment | Round trip propagation (2 ISLs or 4 sat-to-ground links) + RRC and NG re-establishment (referring RRC_IDLE) | None |
| Solution in FIG. 2(a) | Skip retrieval and direct re-establishment | RRC and NG re-establishment (RRC_IDLE) | None |
| Solution in FIG. 2(b) | Retrieve via ISL | Round trip propagation (2 ISLs) | i) The last serving BS maintains context; and ii) ISL exists |
| Solution in FIG. 2(c) | Retrieve via ground station | Round trip propagation (4 sat-to-ground links) | The last serving BS maintains context |
| Proposed solutions | Pre-transfer of UE context | RRC resume (RRC_INACTIVE) | The last serving BS pre-transfers the UE context to the next BS covering the RNA location |

In view of the above, the control plane latency of the proposed solutions is the lowest, thus it greatly improves the data transmission efficiency, as well as the user experience.

condition i. whether the identity of the next RNA of BS 2 is the identity of the RNA of BS 1, RNA location #1.

If BS 2 is about to cover another location, for example,

RNA location #7, rather than RNA location #1, BS 2 shall transmit a NACK to BS 1. If BS 2 is going to cover RNA location #1, then this condition is satisfied.

condition ii. whether the data size of the UE context to be transmitted is not larger than a storage capability of BS 2, in other words, whether BS 2 has sufficient storage to store the data to be transmitted by BS 1;

condition iii. whether the total number of UEs whose UE context is to be transmitted is not more than a total number of UEs for which BS 2 can reserve radio resources, that is to say, whether BS 2 is capable of providing service for all the UEs; and condition iv. whether the time for transmitting the UE context is not later than a time when BS 2 leaves RNA location #1, this means the UE context has to be transmitted to BS 2 before BS 2 leaves, if BS 2 left RNA location #1, then there is no point to transmitting the UE context.

Based on the at least one of the above conditions, BS 2 transmits an ACK or NACK to BS 1, to accept or reject the UE context transmission from BS 1.

In some embodiments, BS 1 transmitting the UE context to BS 2 is triggered if at least one of the following conditions is met: i) a timer of BS 2 expires; ii) BS 2 is about to enter RNA location #1; and iii) BS 2 is at an entering point of RNA location #1. Then BS 1 receives a request from BS 2, which requests BS 1 to transmit the UE context to BS 2, for example, the method step 401-1 in FIG. 4(b). In one embodiment, the request may include: i) an identity of the next RNA of BS 2, which is: RNA #1; ii) a storage capability of BS 2; iii) a total number of UEs for which BS 2 can reserve radio resources; and iv) a time when BS 2 leaves RNA location #1.

BS 1 then receives a response to BS 2, and BS 1 made the response at least based on one of the following conditions:

condition i. whether the identity of the next RNA of BS 2 is the identity of the RNA of BS 1;

condition ii. whether the data size of the UE context to be transmitted is not larger than a storage capability of BS 2;

condition iii. whether the total number of UEs whose UE context is to be transmitted is not more than a total number of UEs for which BS 2 can reserve radio resources; and condition iv. whether the time for transmitting the UE context is not later than a time when BS 2 leaves RNA location #1.

Figure 7:
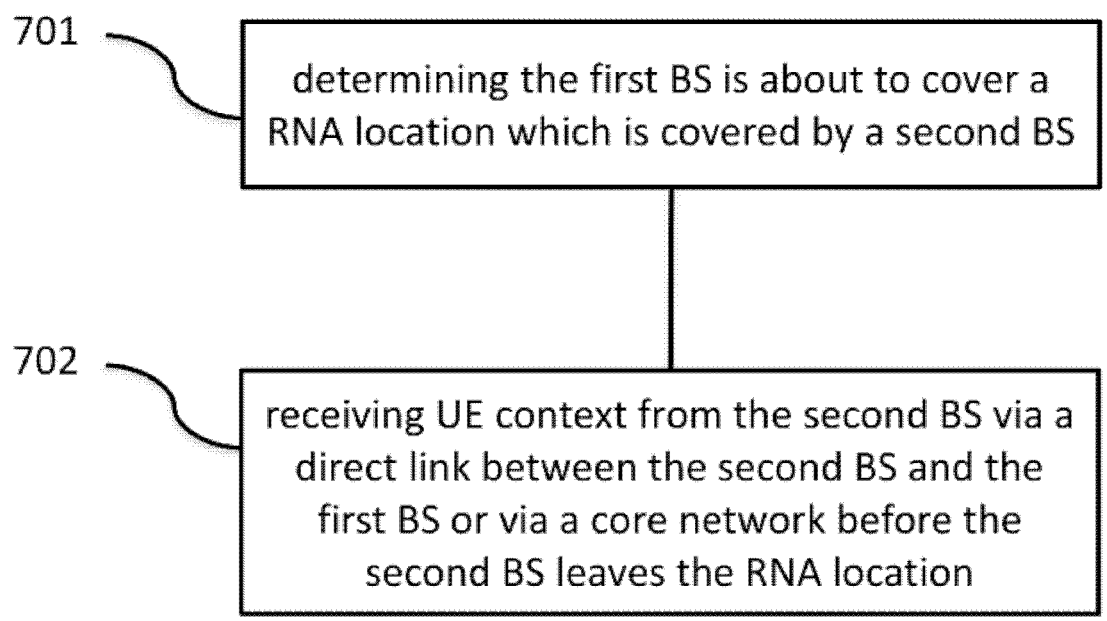
FIG. 7 illustrates a method performed by another BS for wireless communication according to some embodiments of the subject disclosure.

FIG. 7 illustrates a method performed by another BS for wireless communication according to some embodiments of the subject disclosure. In particular, FIG. 7 depicts the method performed by BS 2. In step 701, BS 2 determines that BS 2 is about to cover an RNA location which is covered by BS 1. In step 702, BS 2 receives UE context from the BS 1 via a direct link between the second BS and the first BS or via a core network before the second BS leaves the RNA location.

The UE context may include the UE context of one or more UEs which enter into an inactive state when accessing the first BS, that is, the UE context of the UEs entering into the RRC_INACTIVE state when accessing BS 1. The UE context may include the UE context previously transmitted from a third BS.

When the UE context transmission completed, BS 2 may receive an indicator indicating an end of the UE context transmission from BS 1. Then BS 2 may transmit an ACK or NACK for the UE context transmission to BS 1. BS 2 may transmit a message to the core network indicating that the UE context has been transmitted from BS 1.

BS 2 may determine BS 1 based on the ephemeris data from BS 1, from the core network, or from a UE.

BS 2 receiving the UE context from BS 1 is triggered if at least one of the following conditions is met: i) a timer of BS 1 expires; ii) BS 1 is about to leave the RNA location; and iii) BS 1 is at a leaving point of the RNA location. If at least one of the following conditions is met, then BS 2 receives a request from BS 1 for permission to transmit the UE context stored in BS 1, for example, the method step 401-1' in FIG. 4(c). In one embodiment, the request may include: i) an identity of the RNA of BS 1, which is: RNA #1; ii) a data size of the UE context to be transmitted; iii) a total number of UEs whose UE context is to be transmitted; and iv) a time for transmitting the UE context.

BS 2 then transmits a response to BS 1, and BS 2 made the response at least based on one of the following conditions:

condition i. whether the identity of the next RNA of BS 2 is the identity of the RNA of BS 1;

condition ii. whether the data size of the UE context to be transmitted is not larger than a storage capability of BS 2;

condition iii. whether the total number of UEs whose UE context is to be transmitted is not more than a total number of UEs for which BS 2 can reserve radio resources; and condition iv. whether the time for transmitting the UE context is not later than a time when BS 2 leaves RNA location #1.

Based on the at least one of the above conditions, BS 2 transmits an ACK or NACK to BS 1, to accept or reject the UE context transmission from BS 1.

In some embodiments, BS 2 receiving the UE context from BS 1 is triggered if at least one of the following conditions is met: i) a timer of BS 2 expires; ii) BS 2 is about to enter RNA location #1; and iii) BS 2 is at an entering point of RNA location #1. Then BS 1 receives a request from BS 2, which requests BS 1 to transmit the UE context to BS 2, for example, the method step 401-1 in FIG. 4(b). In one embodiment, the request may include: i) an identity of the next RNA of BS 2, which is: RNA #1; ii) a storage capability of BS 2; iii) a total number of UEs for which BS 2 can reserve radio resources; and iv) a time when BS 2 leaves RNA location #1.

BS 2 then receives a response from BS 1, and BS 1 made the response at least based on one of the following conditions:

condition i. whether the identity of the next RNA of BS 2 is the identity of the RNA of BS 1;

condition ii. whether the data size of the UE context to be transmitted is not larger than a storage capability of BS 2;

condition iii. whether the total number of UEs whose UE context is to be transmitted is not more than a total number of UEs for which BS 2 can reserve radio resources; and condition iv. whether the time for transmitting the UE context is not later than a time when BS 2 leaves RNA location #1.

Figure 8:
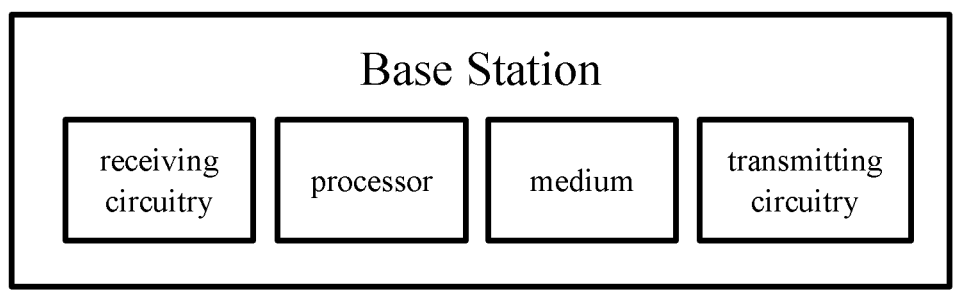
FIG. 8 illustrates a block diagram of a BS according to some embodiments of the subject disclosure.

FIG. 8 illustrates a block diagram of a BS according to the embodiments of the subject disclosure.

The BS may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 6) with the receiving circuitry, the transmitting circuitry and the processor. That is, upon performing the computer executable instructions, the transmitting circuitry broadcasts a first RAN-based Notification Area (RNA) covering a first RNA location; the processor determines a second BS which is about to cover the first RNA location; and the transmitting circuitry further transmits UE context to the second BS via a direct link between the first BS and the second BS or via a core network before the first BS leaves the first RNA location.

The computer executable instructions may also be programmed to implement another method (e.g. the method in FIG. 7) with the receiving circuitry, the transmitting circuitry and the processor. That is, upon performing the computer executable instructions, the processor determines determining the first BS is about to cover an RNA location which is covered by a second BS; and the receiving circuitry further receives UE context from the second BS via a direct link between the second BS and the first BS or via a core network before the second BS leaves the RNA location.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method performed by a first base station (BS), the method comprising:
   broadcasting a first Radio Access Network (RAN)-based Notification Area (RNA) covering an RNA location;
   determining a second BS that is about to cover the RNA location;
   transmitting a request to the second BS for permission to transmit user equipment (UE) context stored in the first BS; and
   transmitting UE context to the second BS via a direct link between the first BS and the second BS or via a core network before the first BS leaves the RNA location.

2. The method of claim 1, wherein the UE context includes the UE context of one or more UEs that enter into an inactive state when accessing the first BS.

3. The method of claim 1, wherein the UE context includes UE context previously transmitted from a third BS.

4. A first base station (BS) for wireless communication, comprising:
   at least one memory; and
   at least one processor coupled with the at least one memory and configured to cause the first BS to:
   broadcast a first Radio Access Network (RAN)-based Notification Area (RNA) covering an RNA location;
   determine a second BS which is about to cover the RNA location;
   transmit a request to the second BS for permission to transmit user equipment (UE) context stored in the first BS; and
   transmit UE context to the second BS via a direct link between the first BS and the second BS or via a core network before the first BS leaves the RNA location.

5. A first base station (BS) for wireless communication, comprising:
   at least one memory; and
   at least one processor coupled with the at least one memory and configured to cause the first BS to:
   determine that the first BS is about to cover a Radio Access Network (RAN)-based Notification Area (RNA) location that is covered by a second BS;
   receive a request from the second BS for permission to transmit user equipment (UE) context stored in the second BS; and
   receive UE context from the second BS via a direct link between the second BS and the first BS or via a core network before the second BS leaves the RNA location.

6. The first BS of claim 5, wherein the UE context includes the UE context of one or more UEs which enter into an inactive state when accessing the second BS.

7. The first BS of claim 5, wherein the UE context includes UE context previously transmitted from a third BS.

8. The first BS of claim 5, wherein the at least one processor is further configured to cause the first BS to:
   receive an indicator indicating an end of UE context transmission from the second BS.

9. The first BS of claim 4, wherein the at least one processor is further configured to cause the first BS to:
   transmit an indicator indicating an end of UE context transmission to the second BS.

10. The first BS of claim 4, wherein the at least one processor is further configured to cause the first BS to:
    transmit a message to the core network indicating that the UE context has been transmitted to the second BS.

11. The first BS of claim 4, wherein the at least one processor is further configured to cause the first BS to:

receive an acknowledgement or a non-acknowledgement of UE context transmission from the second BS.

12. The first BS of claim 4, wherein the at least one processor is further configured to cause the first BS to:
   determine the second BS based on ephemeris data from the second BS, from the core network, or from a UE.

13. The first BS of claim 4, wherein the at least one processor is further configured to cause the first BS to transmit the UE context to the second BS if at least one:
   a timer of the first BS expires;
   the first BS is about to leave the RNA location; and
   the first BS is at a leaving point of the RNA location.

14. The first BS of claim 4, wherein the request includes at least one of:
   an identity of the first RNA of the first BS;
   a data size of the UE context to be transmitted;
   a total quantity of UEs whose UE context is to be transmitted; and
   a time for transmitting the UE context.

15. The first BS of claim 14, wherein the at least one processor is further configured to cause the first BS to:
   receive a response from the second BS, wherein the response is determined based on at least one of:
      whether the identity of a next RNA of the second BS is the identity of the first RNA of the first BS;
      whether the data size of the UE context to be transmitted is not larger than a storage capability of the second BS;
      whether the total quantity of UEs whose UE context is to be transmitted is not more than a total quantity of UEs for which the second BS can reserve radio resources; and
      whether the time for transmitting the UE context is not later than a time when the second BS leaves the RNA location.

16. The first BS of claim 4, wherein the at least one processor is further configured to cause the first BS to transmit the UE context to the second BS if at least one of:
   a timer of the second BS expires;
   the second BS is about to enter the RNA location; and
   the second BS is at a entering point of the RNA location.

17. The first BS of claim 16, wherein the at least one processor is further configured to cause the first BS to:
   receive a request from the second BS for the UE context stored in the first BS.

18. The first BS of claim 17, wherein the request includes at least one of:
   an identity of a next RNA of the second BS;
   a storage capability of the second BS;
   a total quantity of UEs for which the second BS can reserve radio resources; and
   a time when the second BS leaves the RNA location.

19. The first BS of claim 18, wherein the at least one processor is further configured to cause the first BS to:
   transmit a response to the second BS, wherein the response is determined based on at least one of:
      whether the identity of the next RNA of the second BS is the identity of the first RNA of the first BS;
      whether a data size of the UE context to be transmitted is not larger than the storage capability of the second BS;
      whether the total quantity of UEs whose UE context is to be transmitted is not more than a total quantity of UEs for which the second BS can reserve radio resources; and
      whether the time for transmitting the UE context is not later than a time when the second BS leaves the RNA location.

20. A first base station (BS) for wireless communication, comprising:
   at least one memory; and
   at least one processor coupled with the at least one memory and configured to cause the first BS to:
   broadcast a first Radio Access Network (RAN)-based Notification Area (RNA) covering an RNA location;
   determine a second BS which is about to cover the RNA location;
   receive a request from the second BS for user equipment (UE) context stored in the first BS; and
   transmit the UE context to the second BS via a direct link between the first BS and the second BS or via a core network before the first BS leaves the RNA location.

* * * * *